F. J. MATCHETTE.
SIGNALING MECHANISM.
APPLICATION FILED FEB. 26, 1915.
1,222,965.
Patented Apr. 17, 1917.
6 SHEETS—SHEET 5.
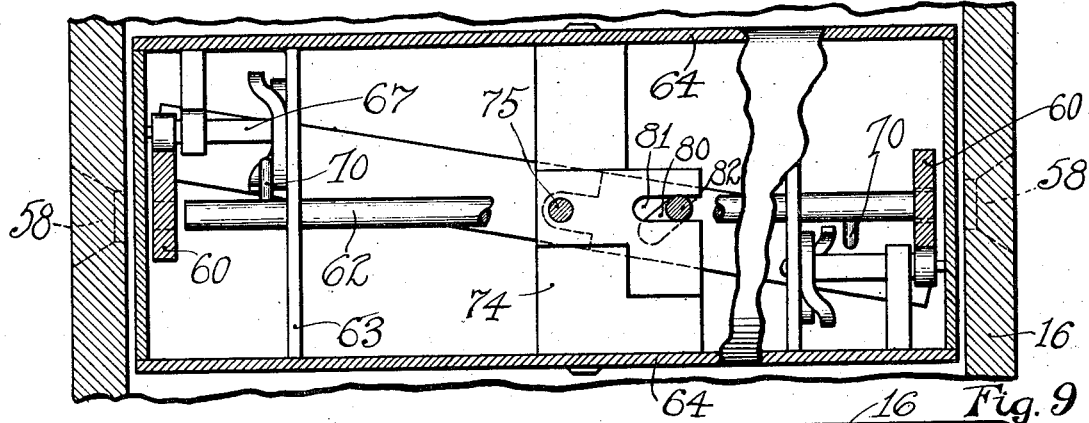
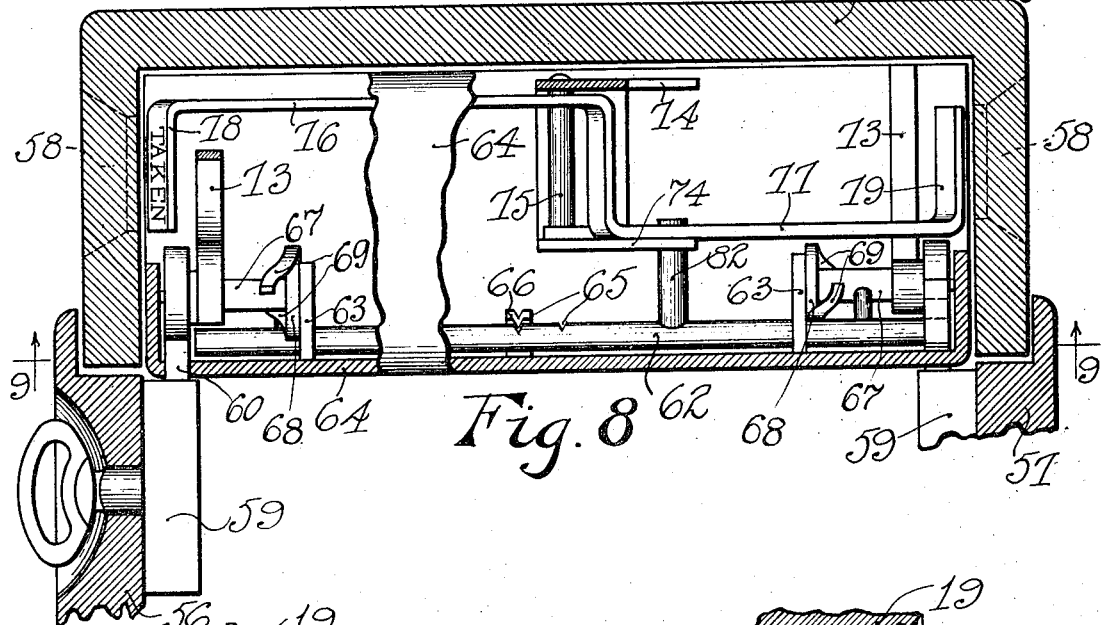
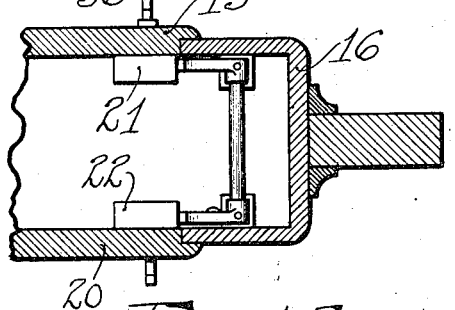
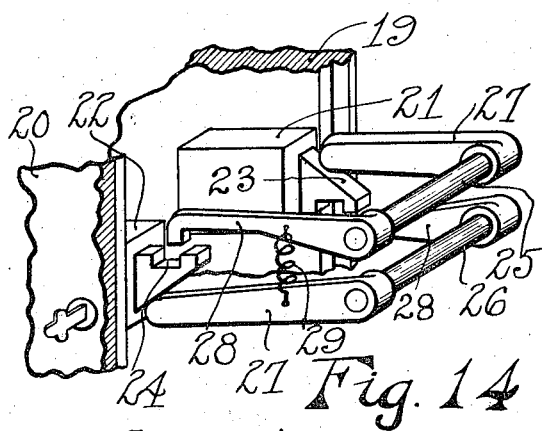
Witnesses.
Cameron A. Whitsett
Ernest W. Rapalee
Inventor
Frank J. Matchette
By Brown, Hanson & Boettcher
Attorneys.

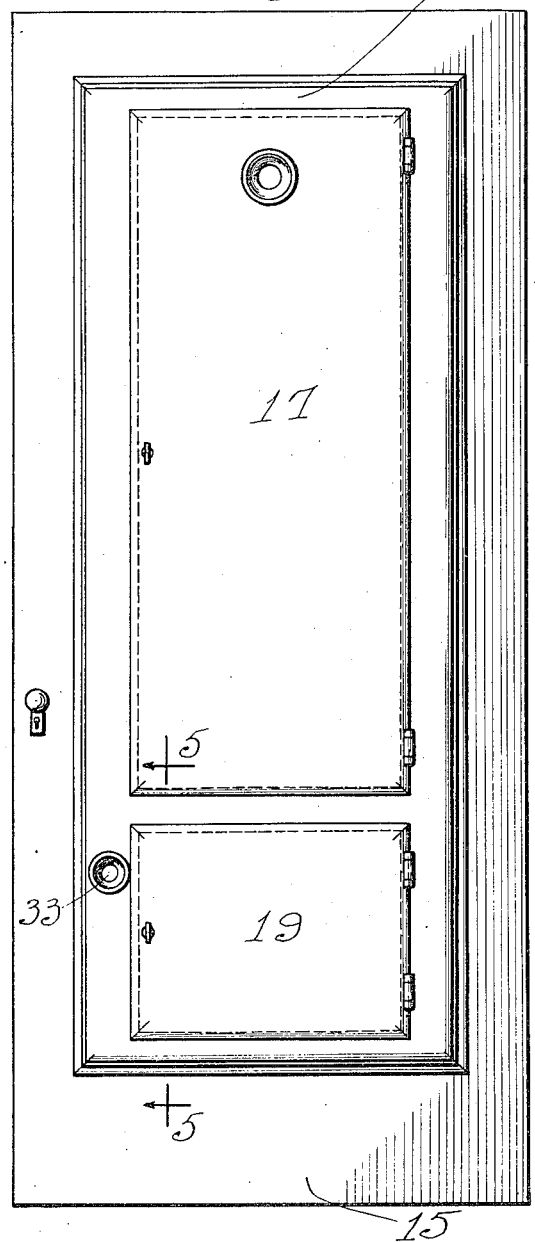
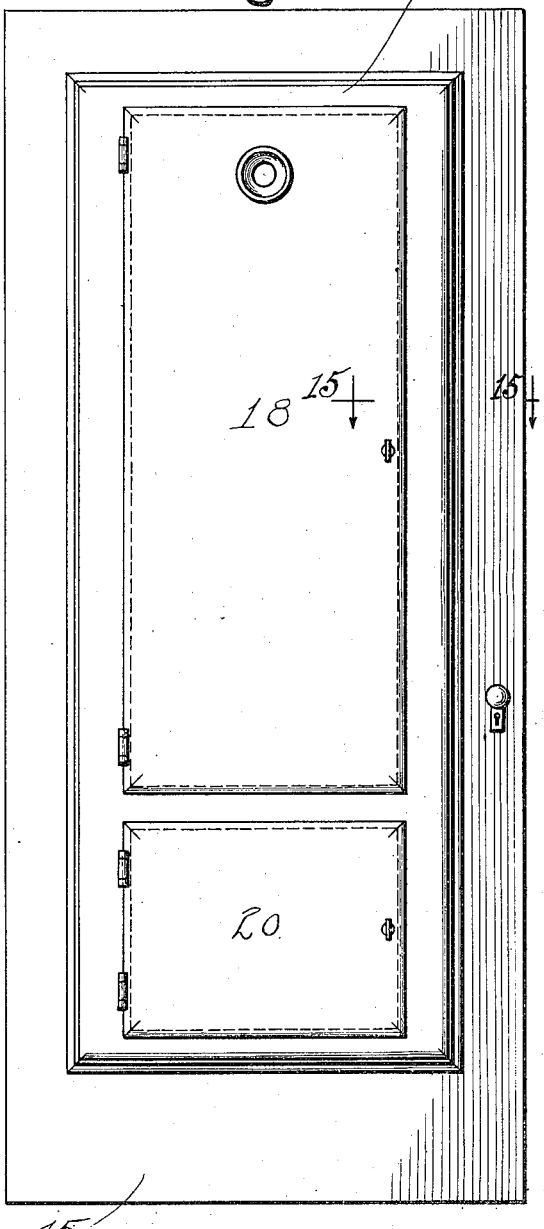

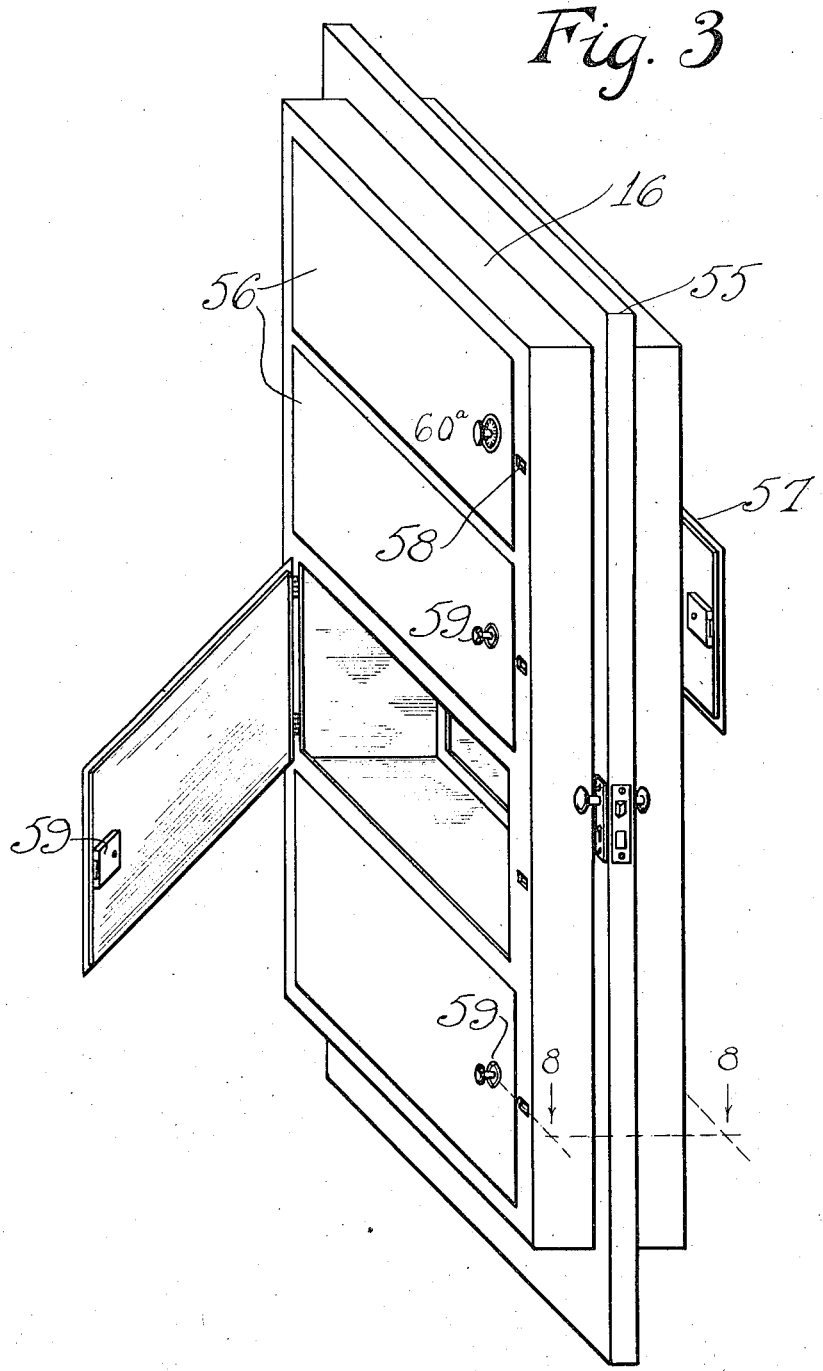

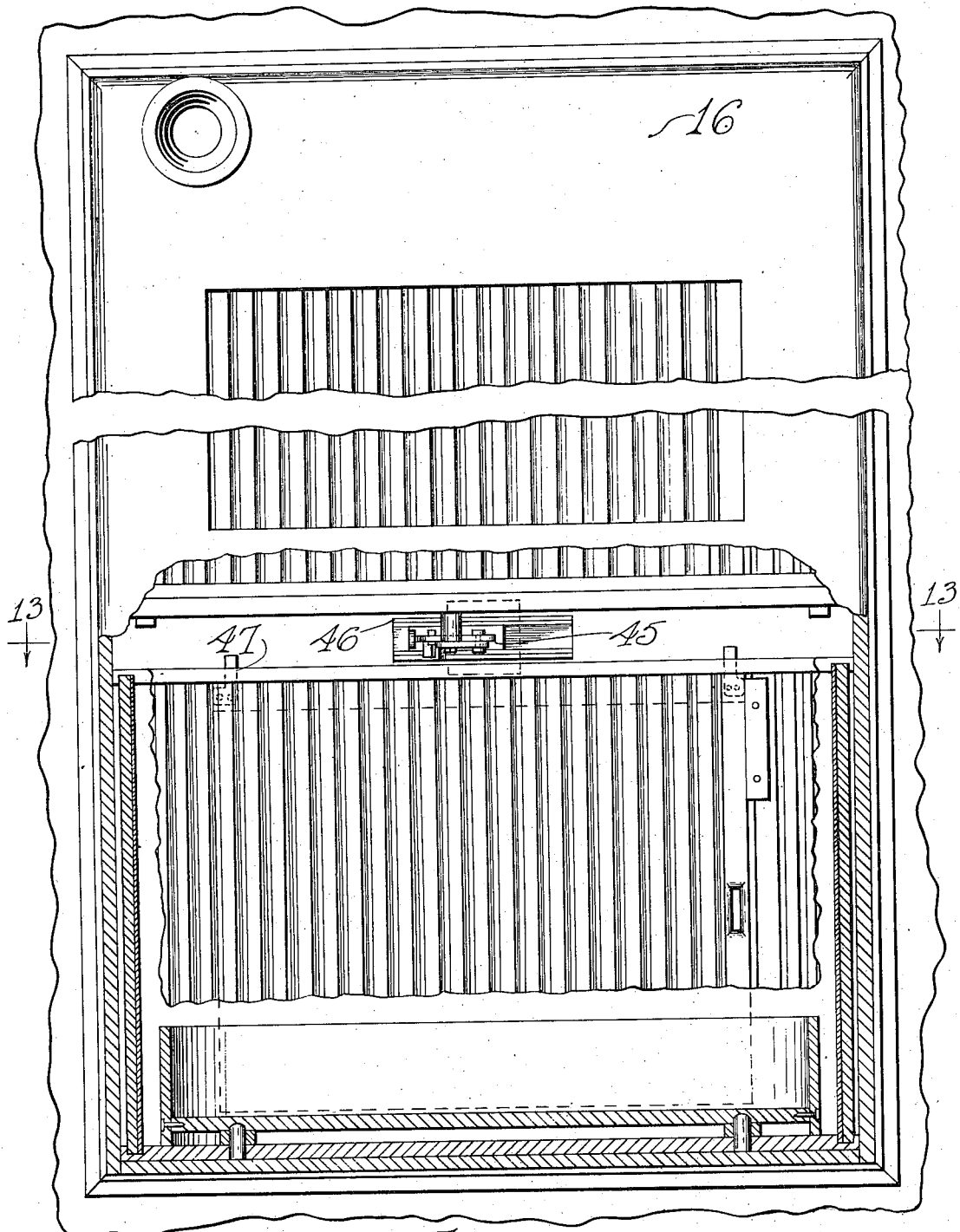

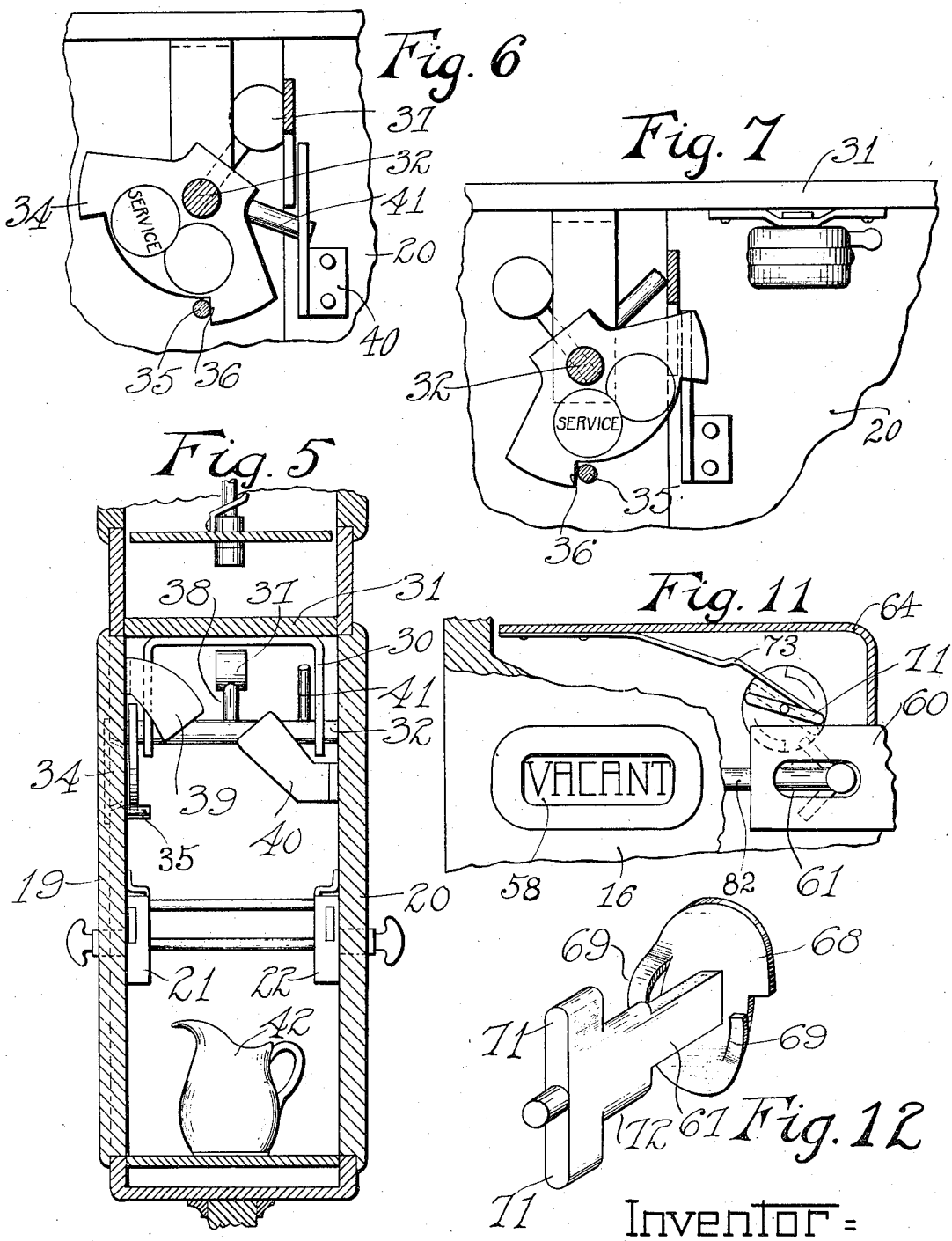

F. J. MATCHETTE.
SIGNALING MECHANISM.
APPLICATION FILED FEB. 26, 1915.
1,222,965.
Patented Apr. 17, 1917.
6 SHEETS—SHEET 6.
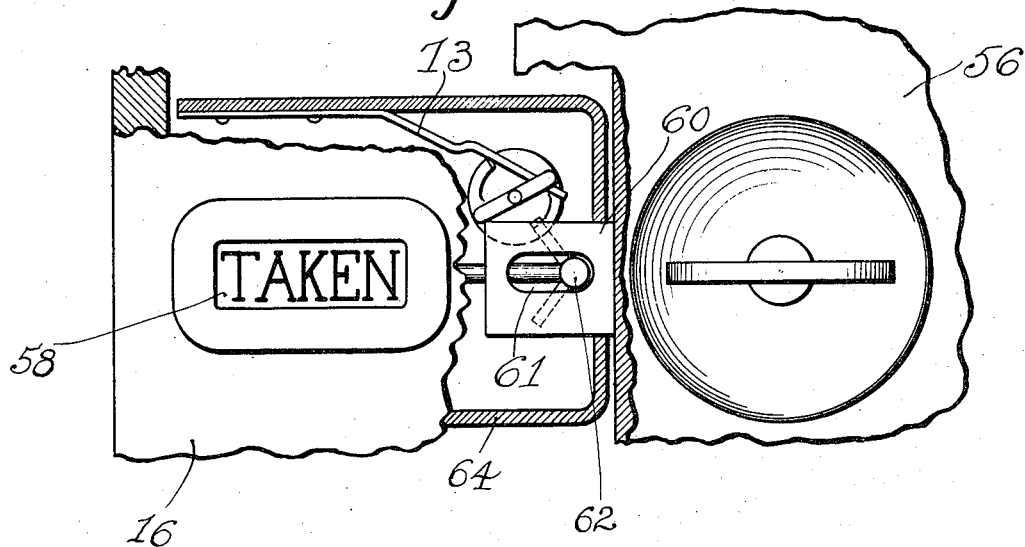
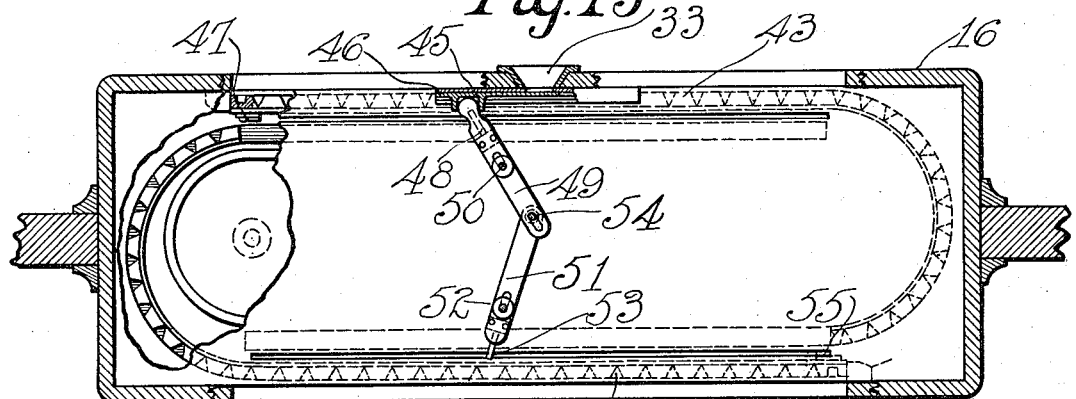

UNITED STATES PATENT OFFICE.

FRANK J. MATCHETTE, OF MILWAUKEE, WISCONSIN.

SIGNALING MECHANISM.

1,222,965.　　　　　Specification of Letters Patent.　　Patented Apr. 17, 1917.

Application filed February 26, 1915. Serial No. 10,819.

*To all whom it may concern:*

Be it known that I, FRANK J. MATCHETTE, a citizen of the United States, residing at Milwaukee, in the county of Milwaukee and State of Wisconsin, have invented a certain new and useful Improvement in Signaling Mechanism, of which the following is a full, clear, concise, and exact description, reference being had to the accompanying drawings, forming a part of this specification.

This invention relates to signaling mechanism.

The signaling mechanism described and claimed in this application is especially useful in service cabinets, interlocking compartments and sealed compartments generally, as well as in similar situations. In my co-pending application Serial No. 844,622, filed June 12, 1914, of which the present application is in part a continuation and in co-pending application Serial No. 852,533, filed July 23d, 1914, of which the present application is also in part, a continuation, I have described service doors which offer a field of particular usefulness for the present invention. It is to be understood that the present invention is intended to be applicable to any situation similar or analogous, or, in fact, to any situation in which the invention is found useful.

I employ the term "sealed compartment" herein to designate an inclosed compartment, to the interior of which access may be had from two or more points or directions, but from only one point or direction at a time, the points of entrance being normally shut off by a proper arrangement of movable closures which I designate door members. The door members are so connected that access to the interior can be had from only one side of the cabinet at a time. The term "sealed compartment" therefore, is used to designate a chamber which, though accessible from different points, always preserves a seal between the said points. The sealed compartment may be employed as a deposit and collection receptacle between a private inclosure and the outside thereof, in which case I may designate the compartment as a service cabinet. In such case the signaling mechanism may be employed to indicate the presence of an article or articles in the cabinet, or it may be employed to indicate the point from which the compartment was last entered, or to designate the point from which the compartment may not be entered.

One object of the present invention is to provide signaling means operable in combination with a sealed compartment to indicate the condition of said compartment. A further and broader object of the invention is to provide signaling mechanism for a plurality of doors whether the same are interlocked or not.

In the accompanying drawings which form a part of the present specification I have illustrated several embodiments of my invention showing a number of typical situations in which the invention may be used.

Figure 1 is an inside elevation of a door having a service compartment in the bottom thereof employing the present invention.

Fig. 2 is an outside or front elevation of the door shown in Fig. 1.

Fig. 3 is an isometric view of another form of service door, which I term a kitchen-cabinet door, employing the present invention.

Fig. 4 is a front elevation partly broken away and partly in section, showing another style of compartment employing the present invention.

Fig. 5 is a cross-sectional view taken on the lines 5—5 of Fig. 1.

Fig. 6 is a fragmentary detail view showing a part of the signaling mechanism which is shown in side elevation at the left hand side of Fig. 5.

Fig. 7 is a similar view showing the signaling mechanism in the operative position.

Fig. 8 is a cross section of the locking and signaling mechanism taken on the lines 8—8 of Fig. 3.

Fig. 9 is a view at right angles taken on the lines 9—9 of Fig. 8 of the same mechanism.

Fig. 10 is an end elevation of part of the operating mechanism for operating the signaling mechanism.

Fig. 11 is a similar view showing the mechanism in a different position.

Fig. 12 is an isometric view of the signal and lock-controlling cam.

Fig. 13 is a horizontal cross section of the cabinet shown in Fig. 4, taken on the lines 13—13.

Fig. 14 is a fragmentary isometric view of the locking mechanism employed in the type of doors shown in Figs. 1 and 2.

Fig. 15 is a fragmentary cross-sectional view taken on the lines 15—15 of Fig. 2.

It will be noted that in the various embodiments illustrating the invention the idea of signaling mechanism actuated or controlled by a door or door member, so as to indicate the occupied or unoccupied condition of a compartment or cabinet, or the locked or unlocked condition of a particular door is presented.

In Figs. 1 and 2 I have illustrated the exterior appearance of a service door embodying the present invention. The service door has the usual door-frame 15 formed of stiles and rails. Within the inner edge of the stiles and rails I have mounted a casing or cabinet 16 having an upper compartment closed by the doors 17 and 18, and a lower compartment closed by the doors 19 and 20. The doors 17 and 18 are so connected, as by interlocks, that only one of said doors can be opened at a time. Thus a seal is provided between opposite sides of the cabinet 16 with respect to the compartment which the doors 17 and 18 close. The doors 19 and 20 of the lower compartment are also suitably connected or interlocked by mechanism which is described in the parent application, Serial Number 844,622, filed June 12, 1914. This interlocking mechanism is shown in Figs. 14 and 15 of the present application.

The mechanism for interlocking both the upper and lower compartments of the door shown in Figs. 1 and 2 is similar. The doors 19 and 20 are provided with locks 21 and 22, respectively, which may be of the spring catch type or may employ throw bolts operated by keys which may be attached or removable. The locking bolt of each lock is provided with an inclined face 23 and an opposite face having a notch 24 therein. A pair of short shafts 25 and 26 are mounted for angular or rotative movement in the casing 16 adjacent the locks 21 and 22. Each shaft is provided with a cam arm 27 coöperating with the inclined surface 23 of the corresponding bolt, and a detent arm 28 coöperating with the notch 24 of the locking bolt.

As can be seen in Fig. 14, the arms 27 and 28 are so disposed that the detent arm 28 of the shaft 25 is opposite the cam arm 27 of the shaft and vice versa. The arms 27 and 28 are normally drawn together by means of the spring 29 or the like. It can now be seen that if one of the bolts of the lock is withdrawn the opposite bolt will be caught by the corresponding detent and cannot be withdrawn to unlock the door. For instance, let it be assumed that the door 19 is first opened. The bolt will be withdrawn, allowing the cam arm 27 to drop, rotating the shaft 25 sufficiently to bring the detent arm 28 into the notch 24 of the bolt of the lock 22, which is attached to the door 20. The relation of the parts is such that before the bolt of the door 19 is completely withdrawn the detent arm 28 will have caught in the notch 24 of the opposite door 20, so that only the door 19 can be opened. When the door 19 is closed and again locked the locking bolt will raise the cam arm 27 of the shaft 25 and will remove the detent from the notch 24 in the bolt of the door 20.

It is of course understood that either door may first be opened, but after one of the doors is opened the other is locked against movement.

The signaling mechanism illustrated in Figs. 5, 6 and 7 coöperates with the interlocking door just described. A U-shaped bracket 30 is secured to the bottom of the partition 31 separating the upper and lower compartments in the cabinet, shown in Figs. 1 and 2, and a shaft 32 is supported and has its bearings in the depending arms of the bracket 30. A target 34 is secured to the shaft 32 so that it partakes of the movement of the shaft 32. One part of the target may be left blank and another part may be supplied with a suitable legend, as indicated in Figs. 6 and 7, or any desired arrangement of legend or coloring or the like may be employed. The target 34 moves in front of a sight opening 33 shown most clearly in Fig. 1. The sight opening 33 is formed in the edge of the cabinet near the lock for the door, so that it is readily visible by a person about to open the door. A stop 35 defines the amount of angular movement which the target 34 may have. Stops 36 may be provided on the target 34 to coöperate with the stop 35, or any suitable arrangement may be provided for limiting the amount of angular movement of the target 34. A weight 37 secured by a rod 38 to the shaft 32 yieldingly retains the shaft 32 and the target 34 in one of its indicating positions. Cam members 39 and 40 are secured to the doors 19 and 20, respectively, and serve to move the target from one indicating position to another.

A pin 41 secured to the shaft 32 projects into the path of the cam 40 when the parts are in the position shown in Fig. 6. When the parts are in the position shown in Figs. 5 and 7 the upper edge of the target 34 lies in the path of the cam 39, so that if the door 19 be opened the edge of the cam 39 will force the top of the disk or target 34 downward, causing the same to swing over center and to display the non-indicating portion in front of the opening 33 in the casing of the door, placing the parts in the position shown in Fig. 6. If the door 20 be thereafter opened the cam 40 will engage the pin 41 and force the same to rise. This throws the weight 37 across the center and causes the signaling disk 34 to assume the position shown in Fig. 7, displaying the legend "Service" before the display opening 33 formed in the cabinet 16. The door shown in Figs. 1 and 2 is, as explained in the parent application, especially applicable for use in hotels and the like. The upper compartment is designed to provide means for sending articles in and out of a hotel room, while the lower compartment is designed to receive articles only from the outside of the room to the inside of the room. It is to be understood of course that articles may be transmitted in both directions through this lower compartment if so desired.

As illustrative of the use to which the compartment may be put, it is supposed that the occupant of a room calls for supplies, such as a pitcher of ice water or the like. The servants of the hotel will call and, finding the outer door 20 unlocked, will place the article, such, for instance, as the pitcher 42, within a compartment, closing the door after such operation. As soon as the door 20 is opened the cam 40 will engage the pin 41, throwing the target 34 into the position shown in Fig. 7, indicating that the occupant's wishes have been complied with and that the desired article has been placed within the compartment. The outer door is then closed and the interlocking mechanism thereby released. The occupant of the room may then open the door 19, throwing the signaling disk 34 back to the nonindicating position and preparing the mechanism for another operation. It is to be understood that signaling disks 34 may be provided on both sides of the door, and that a suitable sight opening 33 may be employed on the outside of the door as well, to indicate that the article, such as 42, had been removed from the compartment, although, in the particular embodiment illustrated, such modification would not be contemplated, as no one is interested except the occupant of the room in the article which is supplied for his use, and as the compartment is used for unidirectional transmission only.

In Figs. 4 and 13 I have illustrated a modification of the structure shown in Figs. 1 and 2, which modification, however, operates on a very similar principle. In this modification the cabinet 16, which has upper and lower compartments, does not have swinging doors, but is provided with flexible closures in the nature of shutters similar to the structure employed in closing the top of a roll-top desk. I shall describe in this connection only the mechanism for the lower compartment.

The shutters 43 and 44 are arranged to run in parallel tracks disposed in the top and bottom of the compartment and are of such length that the rear end of each shutter will cover the opposite opening before the front end will uncover the desired opening. In this manner a seal is always provided between the opposite sides of the service cabinet 16. A sight opening 33 is disposed in the central part of the cabinet, and behind this opening a target 45, sliding in suitable guides 46, may be displayed. The door 43 bears a projection 47 which coöperates with a spring tongue 48, shown in dotted lines in Fig. 13, which spring tongue is secured on the under side of the lever 49, pivoted on the point 50. The end of the lever 49 projects into a socket on the slide 45, so that movement of the lever will move the slide back and forth in the guides 46. A similar lever 51 pivoted at 52 and having a projecting spring finger 53 is coupled to the lever 49 by means of the pin 54. The front edge of the door 44 carries a projection 55 similar to the projection 47 on the opposite door, and this projection 55 coöperates with the spring finger 53 on the lever 51 to move the indicating slide or target 45 in the same manner except that it operates in the reverse direction. If the outer door be opened for the deposit of an article the arm 55 engaging the flexible finger 53 will not move the signaling target, as the same is at the limit of its movement, but on the return movement to close the door or curtain 44 the arm 55 will catch upon the finger 53 to shift the position of the signaling target. The person on the inside of the room will observe the indication and by opening the door or curtain 43 may remove the article therein. In doing so the arm 47 engaging the spring finger 48 does not shift the target, but upon closing the door or curtain 43 the target 45 is shifted back to the original position.

Although the doors or curtains 43 and 44 are not directly connected so as to interlock, they are connected by means of the casing 16 itself, so that access can be had to the compartment from only one side at a time.

Instead of employing two curtains or doors I may employ only one continuous curtain, which will be of such length that only one opening can be uncovered at a time. The operation of such a curtain is obvious from the description given above.

In Figs. 3, 8, 9, 10, 11 and 12 I have illustrated another embodiment of my invention in the form of a kitchen cabinet service door, which is used for supplying groceries and the like to a house or apartment or any private premises, and for sending out articles, such as laundry. In this case a cabinet 16 is mounted upon the frame members of a door 55, in a manner similar to the cabinet shown in the other modification. The cabinet 16 is divided into a number of compartments, each compartment being closed by a front door 56 and an inside or rear door 57. In the embodiment shown in Fig. 3 the three lower compartments are locked by means of spring locks 59 on both the inside and the outside. The other compartment may be locked by means of a combination lock 60$^a$, while the inside door may be closed by the usual spring lock. Indicator openings 58 are cut in the casing 16 adjacent each one of the locks, to indicate the occupied or vacant condition of the corresponding compartment. Suitable interlocking means is provided between the locks on the inside doors and the locks on the outside doors, and target mechanism is moved in conjunction with the locking mechanism so as to indicate the locked or unlocked condition of the door, which in turn indicates in general the occupied or vacant condition of a compartment. Each spring lock 59 is provided with a spring bolt 60, which bolt has a slot 61 therethrough. A locking bar 62 is adapted to enter the slot 61, as will be explained later. This locking bar 62 slides in bearings 63 supported in the auxiliary casing 64 on the inside of the casing 16. The locking bar 62 is provided with notches 65 adapted to be engaged by a spring 66 to retain the locking bar 62 yieldingly in one of its extreme positions. A cam member 67, shown more clearly in Fig. 12, is pivoted adjacent the end of the lock bar 62 on each side of the casing. The cam member 67 bears on one end a disc 68 having extending cam fingers 69 adapted to engage the pins 70 on each end of the interlocking bar 62. The opposite end of the cam member 67 bears a ratchet portion 71 which is engaged by the spring bolt of one of the spring locks 59, as will be later described. Adjacent the ratchet 71 is a spring eccentric cam 72. The cam 72 is normally engaged by a leaf spring 73, shown more clearly in Figs. 10 and 11. A pair of auxiliary brackets 74 which are attached to the auxiliary casing 64 support a short shaft 75 in the central portion of the auxiliary casing 64. This shaft has mounted upon it a pair of swinging arms 76 and 77, bearing upon their extremities targets playing back of the sight openings 58 on both the inside and outside of the casing 16. The arms 76 and 77 may be formed of an integral strip bent into the form shown in Fig. 8. The targets 78 and 79 may be formed by bending at right angles the ends of the arms 76 and 77, respectively. Suitable legends are arranged on these targets, so that the legend "Taken" will appear before both sight openings 58 on the front and on the rear side of the door simultaneously, and when the arms are shifted to another position the legend "Vacant" will appear opposite both sight openings. The arm 77 has a diagonal slot 80 therein and one of the brackets 74 adjacent thereto has a horizontal slot 81. A pin 82 secured to the locking bar 62 has its ends engaging the slots 80 and 81.

It can be seen that as the locking bar 62 is shifted horizontally the arms 76 and 77 will be caused to swing back and forth on the pivot 75, thus displaying the different legends before the sight openings at different times. Let it be assumed that the compartment illustrated in Figs. 8, 9, 10 and 11 is vacant. The parts will then be in the position shown in Figs. 8, 9 and 11: The inside door being locked by the end of the locking bar 62 extending into the slot 61 in the spring bolt 60 of the door. The outside door 56 can now be unlocked by withdrawing the bolt 60 of that door, and an article may be deposited in the compartment, but, as the locking bolt 60 is withdrawn in opening the outer door, the end of the ratchet 71 will be allowed to drop down into the dotted-line position shown in Fig. 11, so that as soon as the door is closed and the bolt 60 returns to the locking position, the end of the bolt 60 will catch on the side of the cam 71 and will cause it to move through the positions shown in Fig. 10, into the position shown in full lines in Fig. 11. The spring 73 in each case serves by means of the flattened cam 72 to snap the cam member 67 over the said position. The rotation of the member 67 caused by engagement of the bolt 60 with the ratchet 71 rotates the disc 68 bearing the cam fingers 69. These cam fingers are arranged to engage one of the pins 70 adjacent the cam member. The inclined face of one of the cam fingers 69 striking the pin 70 forces the locking bar 62 toward the bolt 60, which is being moved to an inward or locking position, and causes the same to be locked by the end of the locking bar 62 protruding into the slot 61, in the locking bolt 60. At the time that the locking bar 62 is being shifted to engage the locking bolt 60, the pin 82 moving in the guiding slot 81, and in the diagonal slot 80 of the swinging arms 76 and 77, will cause the arms to move about the pivot 75 and to display the legend "Taken" before the sight openings 58 on both sides of the cabinet. It will then be impossible for the person who has closed the door 56 to again open the same until the opposite door 57 has been opened and closed in the same manner.

For instance, suppose that the grocer delivers a package by placing the same in the open compartment shown in Fig. 3. As soon as he closes the outer door 56 the same is interlocked by means of the interlocking bar 62 as above explained, and the indicator will display the legend "Taken" to indicate that an article has been deposited in the compartment. The housewife on the opposite side of the cabinet can see by the indicator which one of the compartments has been used and thereby knows in which one of the compartments the article has been deposited. She may allow the same to remain until it is desired to remove the parcel, at which time she can unlock the inner door 57, remove the parcel and close the door, again restoring the parts to the position in which the inner door is locked and the outer door unlocked. It can thus be seen that the signaling or indicating mechanism always indicates the condition of the compartment, and indicates which of the doors leading to the inside of the compartment can be unlocked. The upper compartment may be employed to furnish an outgoing channel for laundry, etc. To this end the outer door is locked by a simple combination lock, or may have a removable key, which allows the agent of the laundry company to have access to the compartment to remove the articles placed therein. The signaling mechanism of this compartment is similar to the mechanism just described.

While I have described the signaling mechanism of my invention as being in each case applied to a sealed compartment and have shown embodiments in which it is combined with interlocking mechanism in a sealed compartment, it is to be understood that I may employ signaling mechanism in such situations where the compartment is not necessarily sealed at all times; that is, where the interlock does not need to be absolutely positive and where the signaling mechanism may be the means for indicating the door which is to be opened independent of the means for locking the doors. Such a situation might arise where it is desired to indicate the occupied or vacant position of a room in a house, in which case locking of the doors might not be desired, but an indication that the room is occupied might be desirable. Numerous changes and modifications will at once become apparent to those skilled in the art. All of these modifications and variations are considered to come within the spirit and scope of my invention as defined by the appended claims.

What I claim as new and desire to protect by Letters Patent of the United States is:

1. In combination, a compartment, a plurality of apertures therein, movable closures for said apertures, said closures movable to expose only one of said apertures at a time, and signaling mechanism in said compartments, said signaling mechanism controlled by said movable closures.

2. In combination, a compartment having a plurality of apertures, movable means to close said apertures, and signaling mechanism giving a signal exterior to said compartment, said signaling mechanism being controlled by said movable means.

3. In combination a compartment, apertures in said compartment, movable closing means for closing said apertures, said closing means being provided with interconnecting means allowing said movable means to uncover only one of said apertures at a time, signaling means in said compartment, said means normally at non-indicating position, and actuating means to move said signaling means to the indicating position, said actuating means and the signaling means being disconnected when the movable closing means is moved to expose an aperture.

4. In combination, a compartment having a plurality of apertures, movable means for closing said apertures, and signaling mechanism in said compartment giving an indication exterior of said compartment, said signaling mechanism being controlled by said movable closing means.

5. In combination, a compartment having a plurality of apertures, movable closing means for said apertures, said closing means having means allowing only one of said apertures to be uncovered at a time, and signaling mechanism controlled by the movement of said movable closing means.

6. In combination, a closed compartment having door members allowing admission thereto from a plurality of points, signaling means, controlling means for said signaling means adjacent each door, said controlling means being interconnected for common operation of said signaling means.

7. In combination, a closed compartment having a plurality of entrances thereto, door members for obstructing said entrances, signaling means adjacent one of said entrances, signal-actuating means having arms extending in proximity to each door member, and means on each door member for moving one of said arms to operate said signaling mechanism.

8. In combination, a closed compartment having a plurality of entrances, door members for obstructing said entrances, signaling means adjacent one of said entrances, signal-actuating means having operative connection with each of said doors, said signaling means being operated by said actuating means.

9. In combination, a compartment having a plurality of entrances to the interior thereof, door means normally closing said entrances, connections between said door means preventing the uncovering of more than one of said entrances at a time, signaling means for indicating the occupied or vacant condition of said compartment, and means mounted on said doors for operating said signaling mechanism.

10. In combination, a sealed compartment having several points of entrance, and signaling means for indicating the occupied or vacant condition of said compartment.

11. In combination, a compartment having several openings therein, a signal at each opening, door means for closing said openings, and an operative connection between said door means and said signaling means.

12. In combination, a sealed compartment having a plurality of doors normally closing said compartment, and a signal controlled by each of said doors, said signal indicating the condition of each of said doors, and being located adjacent one of said doors.

13. In combination, a closed compartment having entrances thereto, door means normally obstructing said entrances, means controlled by each of said door means for preventing the opening of the door means at the remainder of said entrances, and signaling means indicating the position of said door means.

14. In combination, a compartment having a plurality of entrances, door means normally obstructing said entrances, signal means adjacent one of said doors, said signaling means having an actuating connection to said doors, the movement of any of said doors causing said signal to give a corresponding indication.

15. In combination, a closed compartment having two entrances disposed at different points, doors for said entrances, signaling means adjacent one of said entrances, and means at each of said entrances controlled by said doors for causing actuation of said signaling means.

16. In combination, a compartment having entrances on opposite sides thereof, doors for said entrances, and signaling means connected to said doors for indicating the door last operated.

17. In combination, a sealed compartment having entrances on opposite sides thereof, doors for said entrances, and signaling means operated by said doors in turn.

18. In combination, a closed compartment having a plurality of entrances thereto, doors normally obstructing said entrances, said doors being movable one at a time to admit the passing of an article into said compartment, and out thereof at another of said doors, signaling means for indicating when one of the doors has been actuated to remove said article.

19. In combination, a compartment having oppositely-disposed entrances therein, door means for closing said entrances, said door means being alternately operable to allow passage of an article to said compartment, and indicating means for indicating when the opposite door has been actuated to deposit or remove an article.

20. In combination, a cabinet, a pair of doors for said cabinet, interlocking means for said doors, said means preventing more than one door being opened at a time, signaling means, and cam means operated by opening a door for operating said signaling means.

21. In combination, a cabinet, doors on opposite sides of said cabinet for permitting access thereto, a sight opening in said cabinet, an oscillating shaft bearing a target back of said opening, and cam means on each of said doors for actuating said shaft.

22. In combination, a cabinet, doors on opposite sides of said cabinet for permitting access thereto, a sight opening in said cabinet, a target back of said sight opening, an oscillating shaft for said target, said target having means for yieldingly holding the same in indicating position, and means connected to said doors for operating said shaft.

23. In combination, a cabinet having doors on opposite sides thereof, signaling means adjacent one of said doors, locks for said doors, and operating means connecting said signaling means with said doors, said operating means causing actuation of the signaling means to indicate when the door on the opposite side has been opened.

In witness whereof, I hereunto subscribe my name this 20 day of Feb., A. D. 1915.

FRANK J. MATCHETTE.

Witnesses:
PERCY S. KAUFMAN,
F. MALLON.